(12) United States Patent
Dowty et al.

(10) Patent No.: US 7,063,386 B2
(45) Date of Patent: Jun. 20, 2006

(54) PASSENGER SEAT WITH TILTING SEAT BOTTOM

(75) Inventors: Mark Brian Dowty, Rural Hall, NC (US); James R. Yurchenco, Palo Alto, CA (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/011,385

(22) Filed: Dec. 14, 2004

(65) Prior Publication Data
US 2005/0179294 A1 Aug. 18, 2005

Related U.S. Application Data

(60) Provisional application No. 60/589,297, filed on Jul. 20, 2004, provisional application No. 60/529,686, filed on Dec. 15, 2003.

(51) Int. Cl.
*A47C 1/022* (2006.01)

(52) U.S. Cl. .................. 297/338; 297/311; 297/312; 297/313; 297/314; 297/337

(58) Field of Classification Search ............. 297/311, 297/312, 313, 314, 337, 338, 452.41, DIG. 3
See application file for complete search history.

(56) References Cited

U.S. PATENT DOCUMENTS

| | | | | |
|---|---|---|---|---|
| 30,706 A | * | 11/1860 | Van Vleck | 297/314 |
| 1,281,921 A | * | 10/1918 | Etherington | 297/314 X |
| 1,364,033 A | * | 12/1920 | Bruns | 297/311 |
| 2,132,291 A | * | 10/1938 | Miklos | 297/314 X |
| 2,284,352 A | * | 5/1942 | Zank | 297/314 X |
| 2,707,986 A | * | 5/1955 | Johnson | 297/314 X |
| 2,799,323 A | * | 7/1957 | Berg | 297/312 |
| 3,147,040 A | * | 9/1964 | Arthur | 297/338 |
| 3,203,732 A | * | 8/1965 | Hoffman | 297/313 |
| 3,833,257 A | | 9/1974 | Dove | |
| 3,982,786 A | * | 9/1976 | Burgin et al. | 297/DIG. 3 X |
| 3,983,640 A | * | 10/1976 | Cardullo et al. | 297/DIG. 3 X |
| 4,018,166 A | | 4/1977 | Gutridge et al. | |
| 4,059,909 A | * | 11/1977 | Kron | 297/DIG. 3 X |
| 4,095,770 A | * | 6/1978 | Long | 248/314 X |
| 4,364,605 A | * | 12/1982 | Meiller | 297/337 X |
| 4,372,606 A | * | 2/1983 | Faull | 297/313 X |
| 4,408,802 A | * | 10/1983 | Adomeit et al. | 297/311 X |
| 4,521,053 A | * | 6/1985 | de Boer | 297/312 |
| 4,538,853 A | * | 9/1985 | Levenberg | 297/337 X |
| 4,756,034 A | | 7/1988 | Stewart | |
| 5,024,485 A | * | 6/1991 | Berg et al. | 297/312 |
| 5,288,127 A | * | 2/1994 | Berg et al. | 297/312 |
| 5,507,555 A | | 4/1996 | Kiguchi | |
| 5,536,067 A | * | 7/1996 | Pinto | 297/312 X |
| 5,560,681 A | | 10/1996 | Dixon et al. | |
| 5,590,930 A | * | 1/1997 | Glockl | 297/313 |
| 5,713,632 A | * | 2/1998 | Su | 297/312 |

(Continued)

FOREIGN PATENT DOCUMENTS

EP          188002 A2 *  7/1986  ............. 297/314

(Continued)

*Primary Examiner*—Rodney B. White
(74) *Attorney, Agent, or Firm*—Adams Evans P.A.

(57) ABSTRACT

A tilting seat bottom assembly for a passenger seat includes: a seat pan assembly for supporting a passenger and a pivot assembly for being attached to the seat frame. The seat pan assembly is mounted for pivotal motion about at least two axes relative to the seat frame, and can be locked in a selected orientation by the passenger.

7 Claims, 5 Drawing Sheets

U.S. PATENT DOCUMENTS

| | | | |
|---|---|---|---|
| 5,857,745 A | 1/1999 | Matsumiya | |
| 5,871,257 A * | 2/1999 | Dundes, Sr. | 297/314 |
| 5,881,407 A * | 3/1999 | Chu Pt | 297/452.41 X |
| 5,913,568 A * | 6/1999 | Brightbill et al. | 297/312 X |
| 5,954,401 A | 9/1999 | Koch et al. | |
| 5,992,798 A | 11/1999 | Ferry | |
| 6,056,362 A * | 5/2000 | de la Haye | 297/314 |
| 6,059,364 A | 5/2000 | Dryburgh et al. | |
| 6,068,280 A * | 5/2000 | Torres | 297/314 X |
| 6,079,782 A * | 6/2000 | Berg et al. | 297/312 X |
| 6,119,980 A | 9/2000 | Ferry | |
| 6,276,635 B1 | 8/2001 | Ferry et al. | |
| 6,305,644 B1 | 10/2001 | Beroth | |
| 6,340,207 B1 * | 1/2002 | Brightbill et al. | 297/312 X |
| 6,357,827 B1 * | 3/2002 | Brightbill et al. | 297/312 |
| 6,412,870 B1 | 7/2002 | Higgins et al. | |
| 6,494,536 B1 | 12/2002 | Plant | |
| 6,595,586 B1 * | 7/2003 | Brightbill et al. | 297/312 |
| 6,623,080 B1 * | 9/2003 | Clapper | 297/452.41 |
| 6,692,069 B1 | 2/2004 | Beroth et al. | |
| 6,769,739 B1 | 8/2004 | Salzer et al. | |
| 6,866,340 B1 * | 3/2005 | Robertshaw | 297/312 |
| 6,910,736 B1 * | 6/2005 | White | 297/312 X |
| 2002/0145321 A1 * | 10/2002 | Brightbill et al. | 297/312 |
| 2003/0030319 A1 * | 2/2003 | Clapper | 297/452.41 |
| 2003/0075962 A1 | 4/2003 | Saltzer et al. | |
| 2003/0085597 A1 | 5/2003 | Ludeke et al. | |
| 2003/0205920 A1 * | 11/2003 | Sprouse et al. | 297/452.41 X |
| 2004/0160112 A1 * | 8/2004 | Clapper | 297/452.41 |
| 2005/0280302 A1 * | 12/2005 | Ropp | 297/344.13 X |

FOREIGN PATENT DOCUMENTS

| | | | |
|---|---|---|---|
| EP | 0869061 A3 | 11/1999 | |
| EP | 1043225 A2 | 10/2000 | |
| EP | 1044878 A2 | 10/2000 | |
| EP | 1097864 A1 | 5/2001 | |
| GB | 2295962 A | 6/1996 | |
| GB | 2331237 A | 5/1999 | |
| JP | 3-1837 | 1/1991 | |
| JP | 03220031 A * | 9/1991 | 297/311 |
| WO | WO 01/32506 A1 | 10/2000 | |

* cited by examiner

PASSENGER SEAT WITH TILTING SEAT BOTTOM

CROSS-REFERENCE TO RELATED APPLICATIONS

This application claims the benefit of U.S. Provisional Application No. 60/529,686 filed Dec. 15, 2003, and U.S. Provisional Application No. 60/589,297, filed Jul. 20, 2004.

BACKGROUND OF THE INVENTION

This invention relates generally to vehicle seating and more particularly to a tourist/coach class aircraft seating arrangement. Aircraft seating is typically divided into various classes, for example first class, business class, and coach or tourist class. For each class of seating, an individual passenger is allotted a preselected amount of space (both area and volume). First-class seats provide the most individual space, and also may include features to improve comfort, such as fully reclining sleeper functions. In contrast, the tourist/coach class is provided with a relatively small amount of space, in order to provide the most efficient transportation and lowest cost. However, this space limitation can produce passenger discomfort or possibly even physical ailments, and also makes it difficult for a passenger to find a comfortable position in which to sleep on long flights.

To alleviate discomfort, it is advantageous for a passenger to sit or lie in various non-conventional positions during a flight. Unfortunately, prior art coach class seats do not readily accommodate varied seating positions. Accordingly, there is a need for a tourist/coach class seat which allows a passenger to sit in various comfortable positions while meeting limited space constraints.

BRIEF SUMMARY OF THE INVENTION

Therefore, it is an object of the invention to provide a vehicle passenger seat which allows a passenger to sit in various positions.

It is another object of the invention to provide a passenger seat having a tiltable seat pan.

These and other objects of the present invention are achieved in the preferred embodiments disclosed below by providing a tilting seat bottom assembly for a passenger seat, including a seat pan assembly for supporting a passenger; and a pivot assembly for being attached to a frame. The seat pan assembly is mounted for pivotal motion about at least two axes relative to the seat frame.

According to another embodiment of the invention, the seat pan assembly includes a rigid seat pan; a resilient seat bottom pad disposed on top of the seat pan; and a fabric dress cover disposed over the seat bottom pad.

According to another embodiment of the invention, the seat pan assembly is attached to a pivot assembly including: a lower pivot member adapted to be attached to a seat frame; and a complementary upper pivot member attached to the seat pan.

According to another embodiment of the invention, each of the pivot members has an arcuate surface.

According to another embodiment of the invention, the seat bottom assembly further includes means for retaining the seat pan assembly in a selected orientation relative to the frame.

According to another embodiment of the invention, the means for retaining the seat pan assembly in a selected orientation comprise at least one hydraulic cylinder having one end connected to the seat pan assembly and another end connected to a fixed structure.

According to another embodiment of the invention, the seat bottom assembly further includes passenger-operable means for selectively allowing or preventing motion of the hydraulic cylinder.

According to another embodiment of the invention, the seat bottom assembly further includes: a plurality of spaced-apart hydraulic cylinders each extending between the seat bottom and the frame; and means for selectively and simultaneously allowing or preventing motion of all of the hydraulic cylinders.

According to another embodiment of the invention, a passenger seat includes: a frame for being attached to a floor of a vehicle; an upwardly-extending seat back carried by the frame; and a seat pan assembly disposed on the frame for supporting a passenger. The seat pan assembly is mounted for pivotal motion about at least two axes relative to the seat frame.

According to another embodiment of the invention, the seat pan assembly includes a rigid seat pan; a resilient seat bottom pad disposed on top of the seat pan; and a fabric dress cover disposed over the seat bottom pad.

According to another embodiment of the invention, the seat pan assembly is attached to a pivot assembly including: a lower pivot member carried by the frame; and a complementary upper pivot member attached to the seat pan.

According to another embodiment of the invention, each of the pivot members has an arcuate surface, the passenger seat of claim 9 further including means for retaining the seat pan assembly in a selected orientation relative to the frame.

According to another embodiment of the invention, the means for retaining the seat pan assembly in a selected orientation comprise at least one hydraulic cylinder extending between the seat pan and the frame.

According to another embodiment of the invention, the passenger seat further includes passenger-operable means for selectively allowing or preventing motion of the hydraulic cylinder.

According to another embodiment of the invention, the passenger seat further includes a plurality of spaced-apart hydraulic cylinders each extending between the seat pan assembly and the frame; and means for selectively and simultaneously allowing or preventing motion of all of the hydraulic cylinders.

According to another embodiment of the invention, the seat bottom assembly further includes an inner cushion structure including a plurality of airtight compartments which collectively define the upper surface; and means for individually varying the air pressure in each of the compartments.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
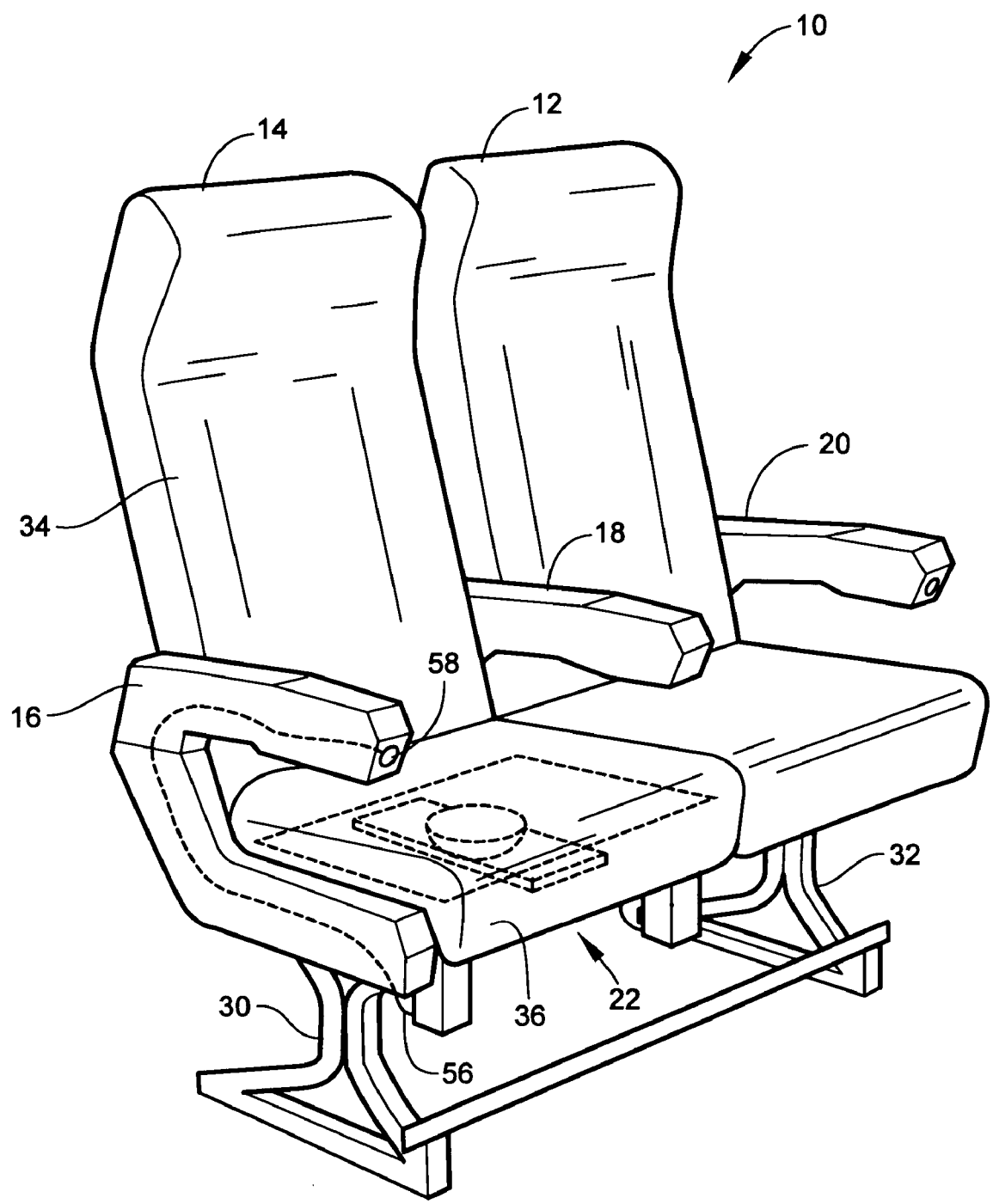
FIG. 1 is a perspective view of a passenger seat set including a pivoting seat pan constructed according to the present invention.
Figure 2:
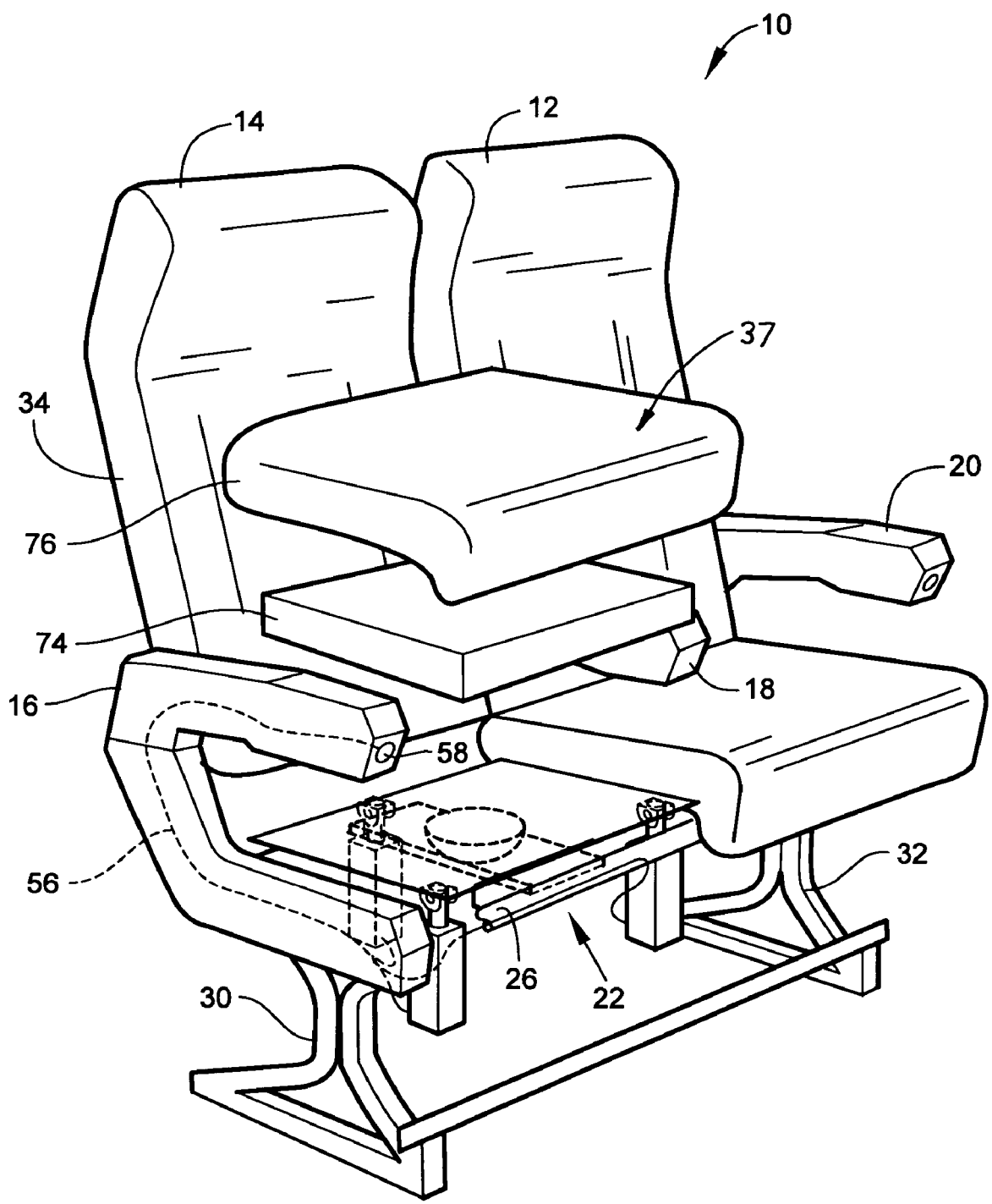
FIG. 2 is an exploded perspective view of the passenger seat of FIG. 1, showing the components thereof.
Figure 3:
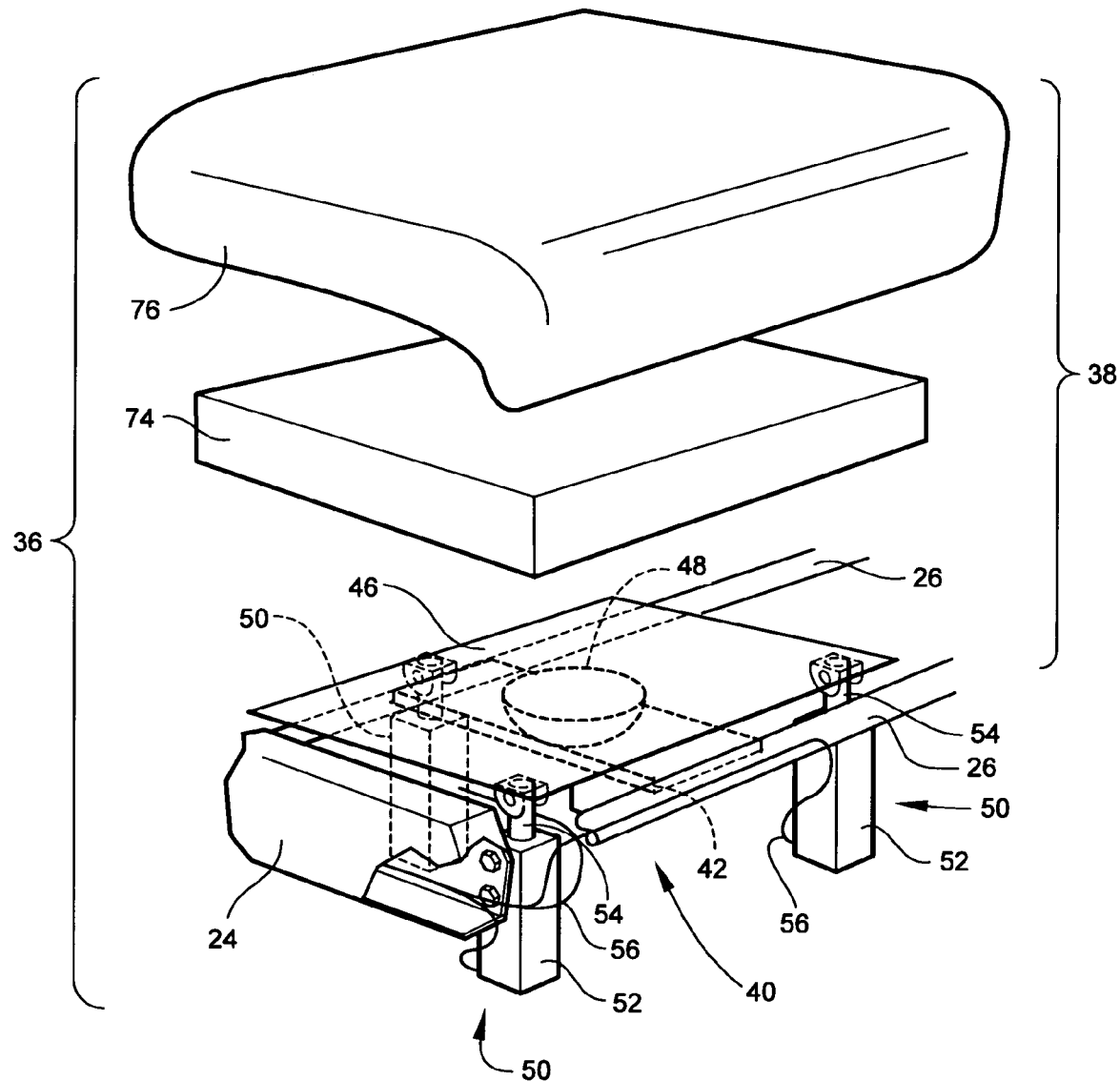
FIG. 3 is an enlarged perspective view of the bottom of the passenger seat shown in FIG. 2.
Figure 4:
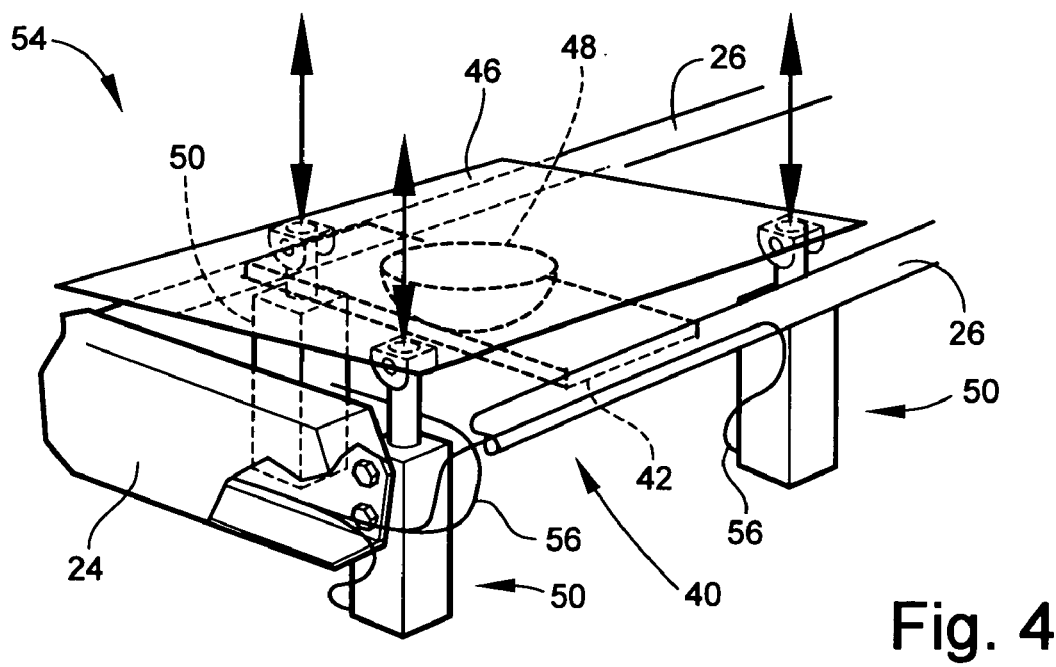
FIG. 4 is another perspective view of the seat bottom shown in FIG. 3.
Figure 5:
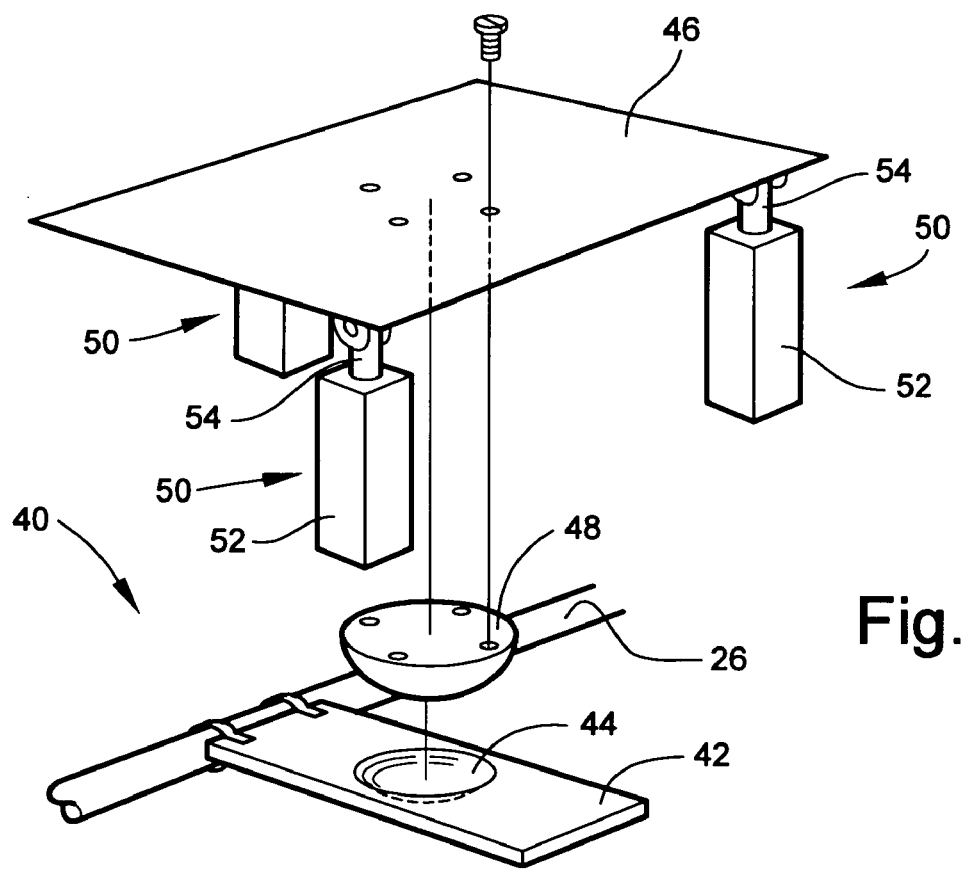
FIG. 5 is a perspective view of a seat pivot for use with the present invention.
Figure 6:
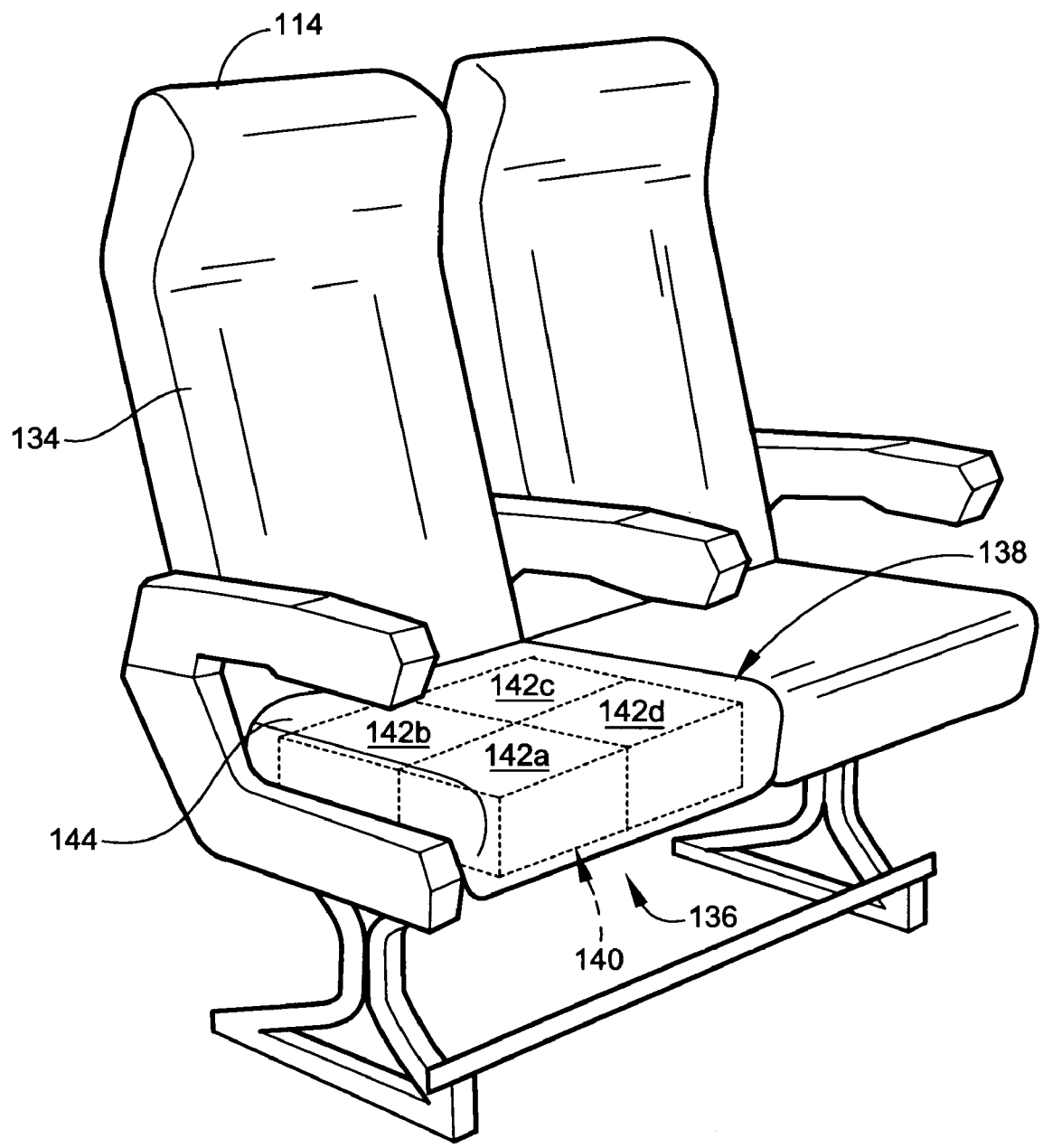
FIG. 6 is a perspective view of a passenger seat including a pivoting seat bottom constructed according to an alternative embodiment of the present invention.

Referring to the drawings wherein identical reference numerals denote the same elements throughout the various views, FIGS. 1–5 illustrate a passenger seat set 10 including a tiltable seat bottom, shown generally at reference numeral 10. The seat set 10 includes two seats 12 and 14 which are collectively provided with three arm rests 16, 18, and 20 each shown in the lowered passenger use position. The seats 12 and 14 are supported by a frame 22 comprising longitudinal members 24 and lateral members 26. The frame 22 is mounted on legs 30 and 32 which are in turn mounted to the deck of the aircraft by track fittings of a known type. For illustrative purposes, the tilting seat bottom feature is only shown with respect to the seat 14, however it will be understood that the tilting feature may also be implemented on the other seat 12.

The seat 14 includes a seat back 34 and a seat bottom assembly 36. The seat bottom assembly 36 presents an upper surface 37 for supporting the passenger. This upper surface 37 may be planar or it may be curved or otherwise profiled to create a comfortable sitting position. The upper surface 37 is effectively pivotable in at least two axes, i.e. it provides both "pitch" and "roll" motions relative to the passenger's frame of reference.

FIGS. 2–5 illustrate one example of how the seat bottom assembly 36 may be constructed to provide an effective pivoting motion. The seat bottom assembly 36 comprises a seat pan assembly 38 and a pivot assembly 40 attached to the frame 22. The pivot assembly 40 comprises a lower pivot member 42, which in the illustrated example is a longitudinally extending plate with a hemispherical recess 44 formed therein. A rigid seat pan 46 is disposed above the lower pivot member 42 and carries an upper pivot member 48 thereon. The upper pivot member 48 may be a hemispherical shape as shown. When the upper and lower pivot members 48 and 42 are engaged the seat pan assembly 38 may rotate and pivot freely relative to the frame 22.

A plurality of adjusters 50 are attached to both the seat pan 44 and the frame 22 in an upright orientation. In the illustrated example each of the adjusters 50 is a hydraulic cylinder of a known type having a body 52 and a telescoping rod 54, such as a HYDROLOK unit, available from P. L. Porter Co., Los Angeles, Calif. 90064 USA. A control valve (not shown) of each adjuster 50 controls the free exchange of fluid between telescoping members of the adjuster 50 when the control valve is opened. The control valve is connected to a suitable passenger control, for example by the illustrated flexible cables 56 and control button 58 mounted on the armrest 16 (see FIG. 1). Other types of adjusters that allow controlled motion of the seat pan 44, such as powered hydraulic or electric actuators, may be used in place of the hydraulic cylinders. As shown, three adjusters 50 are used to support the seat pan 44. This provides a rigid support system while minimizing the weight and cost of the pivot assembly. However, different numbers and arrangements of adjusters 50 may be used to suit a particular application. The seat pan 44 is covered by a seat bottom pad 58 of foam or other suitable resilient material, and a fabric dress cover 60 is placed over the seat bottom pad 58.

To operate the tiltable seat bottom assembly 38, the passenger presses the control button 58. This opens the control valves in the adjusters 50 and allows fluid flow within and between the bodies 52, thereby permitting inward and outward telescoping movement of the rods 54. This allows the passenger to tilt the seat bottom assembly 38 freely about the pivot assembly 40 from side to side or forward to back, i.e. in both "pitch" and "roll" motions relative to the passenger's frame of reference. Once the seat bottom assembly 52 is in the desired position, the control button 58 is released, causing the adjusters 50 to retain the seat bottom assembly 38 in a fixed position.

The tilting motion described above may be implemented by a variety of methods. For example, the pivot assembly 40 need not comprise a spherical joint arrangement as described above, but may utilize any type of support which allows pivoting in at least two axes. Furthermore, the hydraulic cylinders could be replaced with mechanical actuators or pneumatic air bags.

FIG. 7 illustrates a passenger seat 114 including an alternative tiltable seat bottom. The seat 114 includes a seat back 134 and a seat bottom assembly 136. The seat bottom assembly 136 presents an upper surface 138 for supporting the passenger. The seat bottom assembly 136 includes an inner cushion structure 140 which is partitioned into several flexible airtight compartments 142a–142d (four are shown in the present example). Means are provided for selectively inflating and deflating each of these compartments 142a–142d. For example, a small, passenger-controllable air compressor of a known type (not shown) may be selectively connectable to each of the compartments 142a–142d using a suitable multi-directional valve and air tubing. A fabric dress cover 144 is placed over the inner cushion structure 140.

When the passenger wishes to change the orientation of the upper surface 138, the air pressure is increased or decreased in the appropriate compartments 142a–142d For example, if the air pressure is increased in compartments 142a and 142b while the air pressure is held constant in compartments 142c and 142d, the upper surface 138 will effectively be tilted or "rolled" to the left (relative to the passenger). The air pressure in the compartments 142a–142d can thus be varied to produce any desired combination of tilt or "pitch" and "roll".

In another variation, no external source of air pressure is required to operate the cushion structure 140. For example, the compartments 142a–142d may be selectively interconnected so that a fixed air volume can be shuttled from one compartment to the other. This may be done by providing a passenger-operable master valve (not shown) of a known type connected in fluid communication to each of the compartments 142a–142d. When the master valve is opened, it allows air to flow freely between the compartments 142a–142d. When the master valve is closed, it isolates the air in each compartment 142a–142d. The passenger would adjust the cushion structure by manipulating his or her weight. For example, the passenger could open the master valve, then lean forward, compressing the front compartments 142a and 142d, and transferring air into the rear compartments 142b and 142c. The passenger would then close the master valve, fixing the compartments 142a–142d at their present volumes and creating an upper surface 138 that is effectively tilted forward. The passenger could manipulate the cushion structure in a similar fashion to accomplish any combination of "pitch" and "roll" adjustments.

The foregoing has described a seating arrangement having a tiltable seat bottom. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A passenger seat comprising:
    a frame for being attached to a floor of a vehicle;
    an upwardly-extending seat back carried by said frame;
    a seat bottom defining an upper surface for supporting a passenger;
    said seat back and seat bottom being movable independently of one another;
    means for allowing manipulation of said seat bottom, said manipulation means and seat bottom moving in response to body pressures applied by a passenger seated thereon, said seat bottom movable independently of said seat back such that a tilt angle of said upper surface may be effectively pivoted about at least two axes relative to said seat frame to achieve a selected orientation, while the overall height of said passenger above said floor remains substantially constant; and
    passenger-operable means for selectively fixing said seat pan assembly in said selected orientation relative to said frame.

2. The passenger seat of claim 1 further comprising a seat pan assembly including:
    a rigid seat pan;
    a resilient seat bottom pad disposed on top of said seat pan; and
    a fabric dress cover disposed over said seat bottom pad.

3. The passenger seat of claim 2 further comprising:
    a plurality of spaced-apart hydraulic cylinders each extending between said seat pan assembly and said frame; and
    means for selectively and simultaneously allowing or preventing motion of all of said hydraulic cylinders.

4. The passenger seat of claim 1 wherein said seat pan assembly is attached to a pivot assembly comprising:
    a lower pivot member carried by said frame; and
    a complementary upper pivot member attached to said seat pan.

5. The passenger seat of claim 4 wherein each of said pivot members has an arcuate surface.

6. The passenger seat of claim 1 wherein said means for retaining said seat pan assembly in a selected orientation comprise at least one hydraulic cylinder extending between said seat pan and said frame.

7. The passenger seat of claim 6 further comprising passenger-operable means for selectively allowing or preventing motion of said hydraulic cylinder.

* * * * *